United States Patent
Kamperman et al.

(10) Patent No.: US 8,869,298 B2
(45) Date of Patent: *Oct. 21, 2014

(54) ENHANCED CONTENT RESOLUTION METHOD

(75) Inventors: Franciscus Lucas Antonius Johannes Kamperman, Geldrop (NL); Alexis Stephen Richard Ashley, Redhill (GB); Pim Theo Tuyls, Mol (BE)

(73) Assignee: TP Vision Holding B.V., Eindhoven (NL)

( * ) Notice: Subject to any disclaimer, the term of this patent is extended or adjusted under 35 U.S.C. 154(b) by 557 days.

This patent is subject to a terminal disclaimer.

(21) Appl. No.: 12/732,623

(22) Filed: Mar. 26, 2010

(65) Prior Publication Data

US 2010/0178033 A1 Jul. 15, 2010

Related U.S. Application Data

(62) Division of application No. 10/496,467, filed as application No. PCT/IB02/04761 on Nov. 13, 2002, now Pat. No. 7,730,303.

(30) Foreign Application Priority Data

Nov. 27, 2001 (EP) .................................... 01309950
Oct. 18, 2002 (EP) .................................... 02257275

(51) Int. Cl.
*G06F 7/04* (2006.01)
*H04N 21/84* (2011.01)
*H04N 21/8352* (2011.01)
*H04N 7/173* (2011.01)
*G11B 20/00* (2006.01)

(52) U.S. Cl.
CPC .......... *H04N 7/173* (2013.01); *H04L 2209/603* (2013.01); *G11B 20/00855* (2013.01); *H04N 21/84* (2013.01); *H04N 21/8352* (2013.01); *G11B 20/0021* (2013.01); *G11B 20/00731* (2013.01)
USPC .......................................................... 726/27

(58) Field of Classification Search
CPC .......... G06F 21/00; G06F 21/10; G06F 17/30
USPC .............. 380/227–229, 240–242; 726/26–30; 713/164, 167
See application file for complete search history.

(56) References Cited

U.S. PATENT DOCUMENTS 6,826,699 B1 11/2004 Sun
7,036,011 B2 * 4/2006 Grimes et al. ................ 713/156

(Continued)

FOREIGN PATENT DOCUMENTS

EP 940960 A1 9/1999

OTHER PUBLICATIONS

The TV-Anytime Forum, Requirements Series: R-5, Rights Management and Protection Requirements, p. 1-35, Dec. 15, 2000.*

(Continued)

*Primary Examiner* — Beemnet Dada
(74) *Attorney, Agent, or Firm* — Shimokaji & Assoc., P.C.

(57) ABSTRACT

A method of providing automatically verifiable trust in a content resolution process in which a PDR resolves a content reference identifier (CRID) identifying a content item using a resolution authority record (RAR) to obtain a locator identifying a location where the PDR can obtain the content item. Preferably, the measure comprises computing a digital signature over at least part of the contents of the CRID, the locator and/or the RAR. The method may also comprise encrypting at least a data portion of the CRID, RAR or locator. Digital rights needed to access the content item can be provided with the CRID, RAR or locator.

8 Claims, 4 Drawing Sheets

(56) References Cited

U.S. PATENT DOCUMENTS

Figure 1:
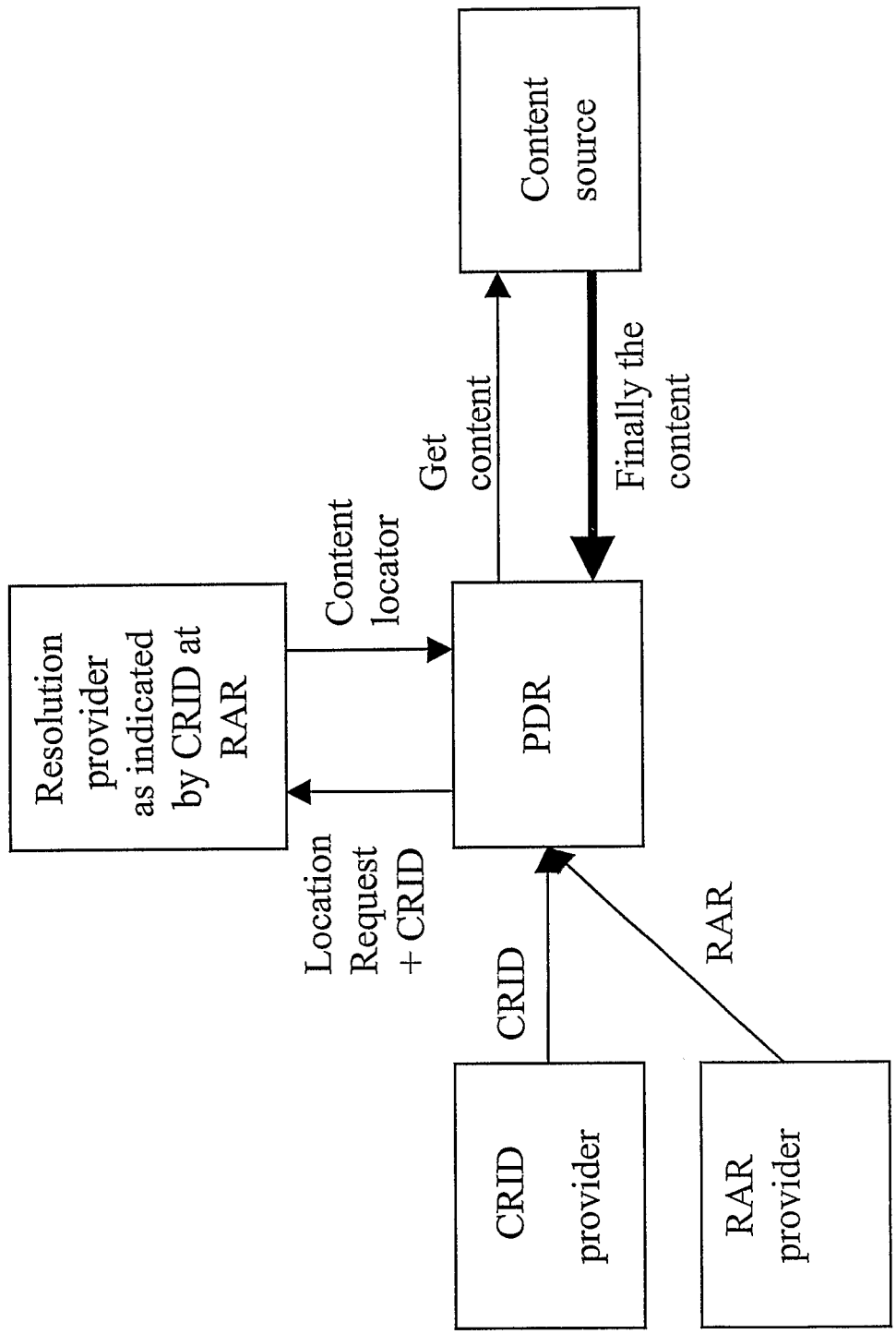

2004/0123109 A1* 6/2004 Choi .......................... 713/176
2004/0172340 A1 9/2004 Bishop et al.
2004/0237100 A1 11/2004 Pinder et al.

OTHER PUBLICATIONS

The TV-Anytime Forum, Specification Series: S-1, Phase 1 Benchmark Applications. p. 1-28. Feb. 16, 2001.*

Pfeiffer, Silvia. TV Anytime as an application scenario for MPEG-7. p. 89-92. 2000.*

Chadwick, Piesing: "DIVIC 1.5 Specifications—TV Anytime and TV Anywhere" TV Anytime, Apr. 1999, XP002237927, Retrieved from the Internet, URL:http//www.davic.org/Download/Spec1 5/Final/tv any.pdf retrieved on d003-04-10: Paragraph '03-41.

Nerve Murret-Labarthe, Right Information Metadata, Canal+ Technologies, Jul. 17, 2000, pp. 1-3, AN 145, TV-Anytime Forum.

\* cited by examiner

ENHANCED CONTENT RESOLUTION METHOD

This is a divisional application which claims the benefit of priority of U.S. patent application Ser. No. 10/496,467, filed May 24, 2004, which is a 35 U.S.C. 371 application of International Patent Application No. PCT/IB02/04761, filed Nov. 13, 2002, and published on Jun. 5, 2003, as WO 2003/047256 A2, which applications are incorporated herein by reference in their entirety.

The invention relates to a content resolution process in which a content reference identifier (CRID) identifying a content item is resolved using a resolution authority record (RAR) to obtain a locator identifying a location where the content item can be obtained.

As the number of channels available to television viewers has increased, along with the diversity of the programming content available on such channels, it has become increasingly challenging for television viewers to identify television programs of interest. Historically, television viewers identify television programs of interest by analyzing printed television program guides. As the number of television programs has increased, it has become increasingly difficult to effectively identify desirable television programs using such printed guides.

More recently, television program guides have become available in electronic format, often referred to as electronic program guides (EPGs). Like printed television program guides, EPGs present overviews of the available content, which can be browsed by the user. The general term content typically comprises things like music, songs, movies, television programs, pictures and the likes, but can also refer to individual scenes, MPEG-4 objects, and so on.

The EPG compiles the overview from metadata that accompanies the individual content items. Metadata for content items is available from a variety of sources. Metadata can be included with a broadcast stream, e.g. as MPEG-2 tables, or downloaded from external databases. For example, a television receiver or Personal Digital Recorder may be provided with an Internet connection, which allows the device to access metadata made available over the World Wide Web.

This metadata generally comprises information such as title, artist, genre and so on, and may also contain a unique content reference identifier (CRID), sometimes also called a content reference identifier. Using the CRID, each individual content item can be uniquely identified. Further, using the CRID further information can be retrieved from a database. For example, a user can select a content item which he wishes to see from the EPG, even though the time and place of broadcast are not yet known. Using the CRID, the system can then retrieve the time and place of broadcast of the content item when this information becomes available.

The CRID is not restricted to broadcast transmissions of content. It could also refer to a location on the Internet, or to any other source. The purpose of content resolution is to allow acquisition of a specific instance of a specific item of content. For example a user may want to record an episode of a television series, but he does not necessarily know when and where that episode will become available. He can then use his personal digital recorder (PDR) or similar device to enter a reference to the episode or series by means of the CRID. Note that a CRID may refer to an entire series or to an individual episode thereof.

Having received a CRID for a content item, the PDR tries to obtain the location of the content item. This information is called a locator and it contains the date, time and channel on which the content item will be broadcast. The user however does not need to be aware of this. Once the PDR has obtained the locator of the content item, the PDR waits for the specified date and time and then records the episode as it is broadcast on the specified channel. Of course, if the locator indicates a location on the Internet or the like, the PDR can simply retrieve the content from the indicated location as soon as it becomes available.

The TV-Anytime standardization body provides a standardized Content Reference ID. See TV-Anytime Forum, www.tv-anytime.org, Specification Series: S-4, on Content Referencing (Normative), Document SP004V11, 14 Apr. 2001.

The syntax of the CRID as used by TV-Anytime is as follows: CRID://<authority>/<data>

The <authority> field indicates the body that created the CRID. An authority will also provide the ability for the CRID to be resolved into locators or other CRIDs. A locator is the name for locations in time and space of content. The <data> field is a free format string that is compliant with the definition of Uniform Resource Identifiers (URIs) as given in RFC 2396. This string should be meaningful to the authority given by the <authority> field.

The CRID is used for location resolution, which can be defined as the process of translating a CRID into other CRID(s) or locators. For instance, a CRID for an entire TV series could be translated into a series of CRIDs for the individual episodes of that series. Location resolution may be done in the recording device (typically a Personal Digital Recorder or PDR) or remotely. A resolution provider does location resolution. Resolution providers use resolving authority records (RARs) to be identified and located. A RAR includes at least an <authority> field, corresponding to a body that creates CRIDs.

A RAR also contains a URL and the resolution provider name. The URL points to the location where resolution information can be found. The resolution provider name contains the name of the body that is providing location resolution. These RARs are made available to PDRs.

Using the above approach, anyone knowing the location of content could act as a resolution provider.

It is an object of the invention to restrict the above content resolution process so that only certain designated entities can participate.

This object is achieved according to the invention in a method comprising applying a measure to at least one of the CRID, the RAR and the locator to provide integrity and origin authentication.

Content and service providers may desire that only authorized resolution providers perform content resolution for their content, for example to be able to protect their reputation. On the other hand, for consumers and PDRs it is important to be able to rely on and trust the CRID authority and resolution provider, so that they can obtain the correct content. So, the inventors have realized that it is desirable to enhance the above approach so that automatically verifiable trust can be introduced in the content resolution process. This protection preferably involves data origin authentication and integrity protection, but can also involve protection against unauthorized access, or maintenance of confidentiality.

If a third party can change the metadata or CRID table, it can make the PDR record other information then was intended including commercials, trailers or just other content. This is very annoying for a user and may lower the trust the user has in the system. To prevent this, the PDR may want to check whether the content came from a trusted source. If the data can be authenticated to originate from one source even when it is distributed using different channels, the PDR can use this to make a choice when confronted with multiple sources of the same content. An example of this is when the data of a certain BBC show can be authenticated as being generated by the BBC, this raises the likelihood that this information is correct.

An embodiment comprises providing a digital signature for at least a portion of at least one of the CRID, the RAR and the locator. Only a properly signed CRID, RAR or locator will be accepted by the PDR. Because of the signature they can be trusted to originate from a trustworthy authority.

In a further embodiment the digital signature is provided for at least a portion of the locator and can be verified using a public key provided by one of a CRID provider and a RAR provider. This way the location of the content to be retrieved can be trusted, i.e. the PDR can verify that the locator has not been changed and that the locator originates from a certain resolution provider.

A further embodiment comprises providing at least a portion of at least one of the CRID, the RAR and the locator in encrypted form. This way only authorized resolution providers are able to interpret the CRID, RAR or locator and perform content resolution.

A yet further embodiment comprises providing a right for access to the content together with at least one of the CRID, the RAR and the locator. This has the following advantages:
  It is not required any more for the user to separately also contact a rights server.
  If content is protected, users are in any case required to contact an authorized resolution authority, as they only in this way obtain the correct rights to use the content.

A further embodiment comprises providing information on obtaining a right to access the content item together with at least one of the CRID, the RAR and the locator. This way the the location resolution process and a DRM system are further integrated. Next to locating the content the PDR will also be capable of resolving the location on where to obtain the rights. A resolution provider may even offer such functionality as a service to the user as it may be able to locate the cheapest rights for that specific piece of content and pass the location of these rights to the user.

A further embodiment comprises providing a benefit with at least one of the CRID, the RAR and the locator. With such means users can be stimulated to contact a specific resolution provider as the user may receive benefits, such as a discount for buying a movie.

The invention further relates to a device arranged for resolving a content reference identifier identifying a content item using a resolution authority record to obtain a locator identifying a location where the content item can be obtained, conditionally upon verifying a measure applied to at least one of the CRID, the RAR and the locator to verify integrity and origin authentication. Various advantageous embodiments of the device are set out in the dependent claims.

Figure 2:
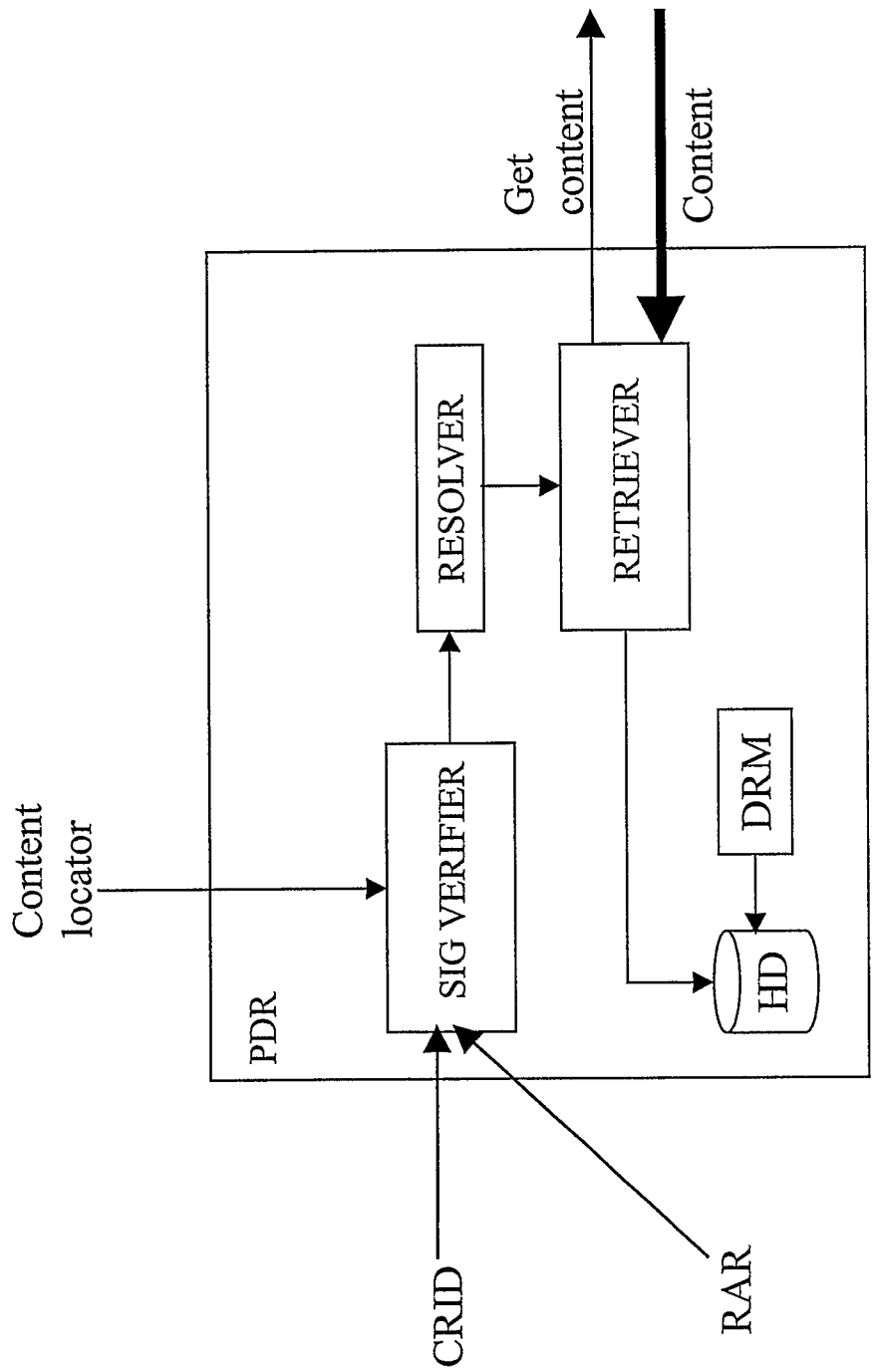
Figure 3:
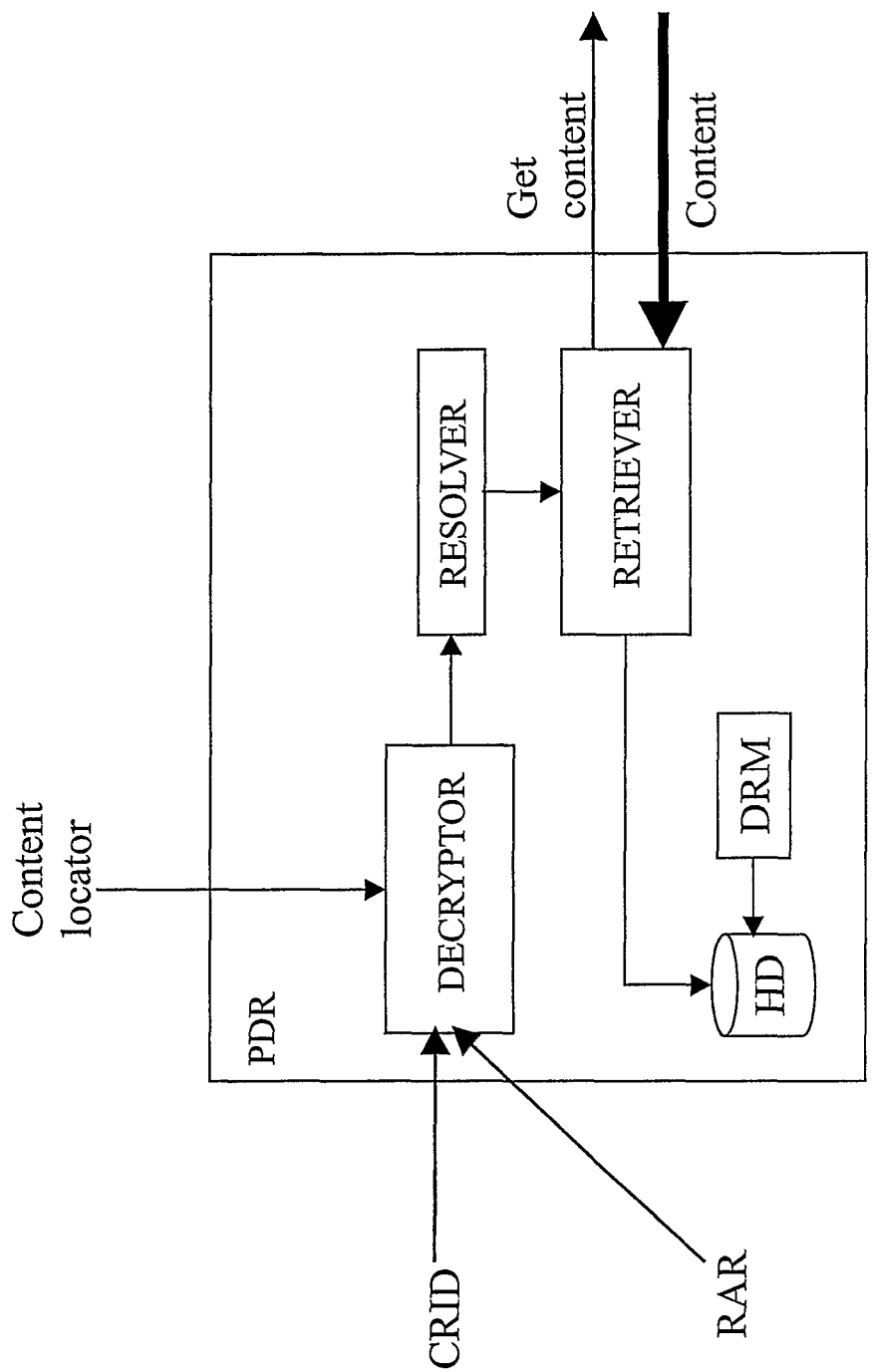

These and other aspects of the invention will be apparent from and elucidated with reference to the illustrative embodiments shown in the drawings, in which:

FIG. 1 schematically illustrates the process of content resolution, in which A Personal Digital Recorder or PDR is instructed to record a content item identified by a Content Reference Identifier CRID;

FIG. 2 schematically illustrates a first embodiment of the PDR;

FIG. 3 schematically illustrates a second embodiment of the PDR; and

Figure 4:
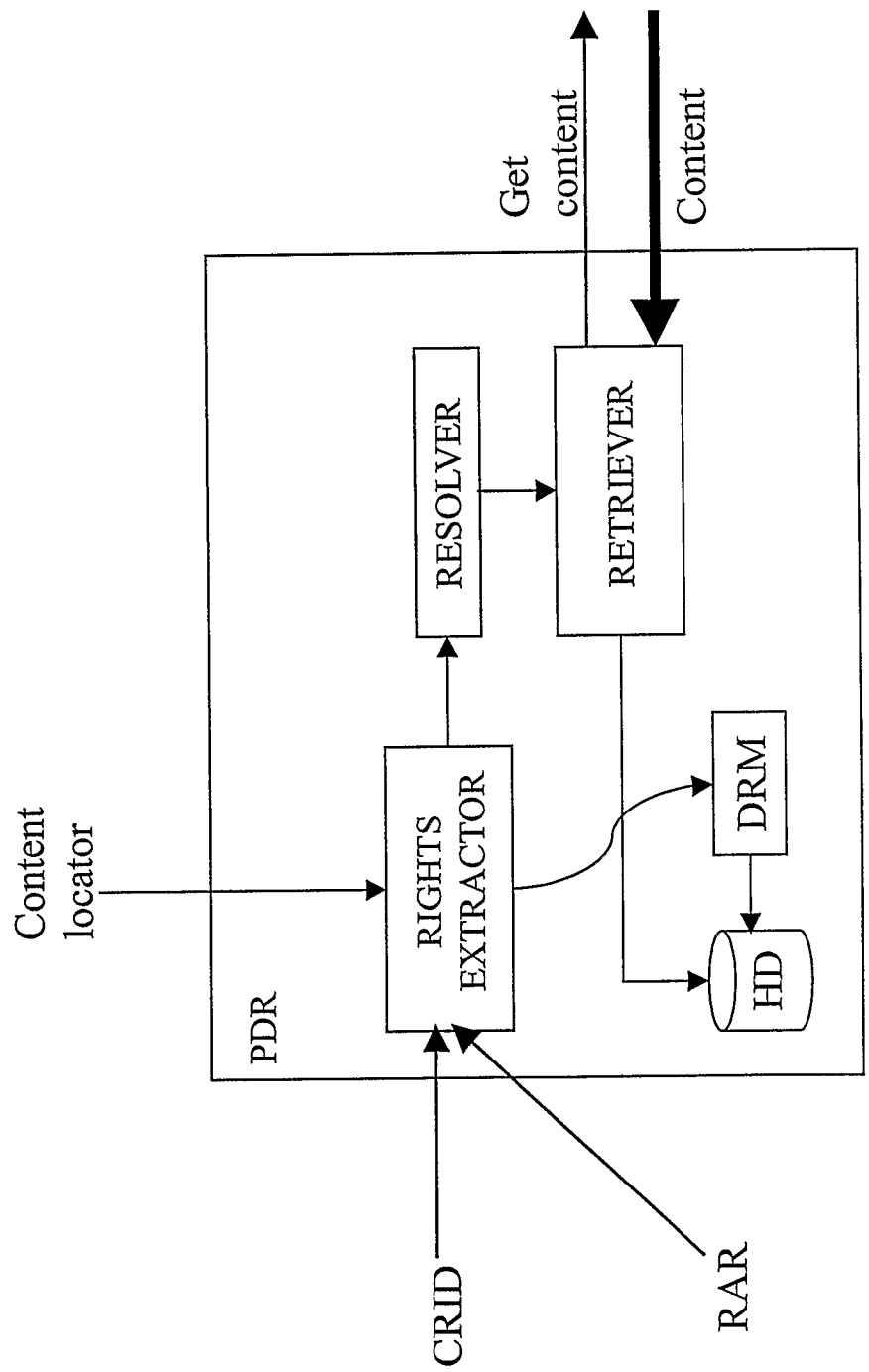

FIG. 4 schematically illustrates a third embodiment of the PDR.

Throughout the figures, same reference labels indicate similar or corresponding features. Some of the features indicated in the drawings are typically implemented in software, and as such represent software entities, such as software modules or objects.

FIG. 1 schematically illustrates the process of content resolution. A Personal Digital Recorder or PDR is instructed to record a content item identified by a Content Reference Identifier CRID. Instructing the PDR to record a content item, or in other words scheduling that content item for recording can be done in a variety of ways. A presently common way is that the user manually indicates, e.g. by selecting the content item in the EPG, that the content item is to be recorded. It will be readily understood that part or all of the functionality ascribed to the PDR below could also be incorporated into one or more other devices, such as television receivers, set-top boxes or personal computers.

The PDR, or another device to which the PDR is connected, may be equipped to determine kinds of content items that the consumer may be interested in. This is known as user profiling or recommender systems. By keeping track of content items which the consumer views, and employing an implicit and/or explicit rating system for such content items, it becomes possible to predict with varying degrees of accuracy which other content items the consumer may be interested in. It then becomes possible to automatically record content items which are likely to be of interest to the consumer. Such content items could then be recorded by the PDR. Many techniques for user profiling are known in the art. When the PDR determines, using user profiling, that a particular content item may be of interest, it schedules the content item for recording.

The CRID for the content item is used to facilitate automatic recording of the content item. The CRID could be entered manually by the user, or be the result of selecting a content item through an Electronic Program Guide. This second option assumes that the CRID is somehow provided to the PDR together with other metadata used in the EPG. Alternatively, if the CRID is not known by the user or by the PDR, the user could perform a search using for example the title of the content item in a metadata database, and select the desired content item from the search results. The CRID is then supplied to the PDR by the search engine.

There are many other ways to provide the CRID to the PDR. For example, a trailer or preview for a movie could be broadcast with the CRID embedded in the content of the commercial in some way (e.g. a watermark). The user could then press a button on his remote control, television or PDR. The PDR or television then extracts the CRID from the content.

Once the CRID for the content item is known, the PDR tries to obtain locator information for the content item, using the CRID as input. This locator information is not necessarily always available. For example, the CRID may refer to a movie that has only recently been released in movie theaters. This movie is not likely to be broadcast on television in the near future, so it cannot be scheduled using EPG information. In such a case, the PDR should regularly try to obtain the locator, as the locator may become available later (e.g. a year later, when the movie is going to be broadcast on TV). The CRID could also refer to a TV series, which is then resolved into a number of CRIDs for individual episodes of that series. It is possible that no locator information is available for some episodes. Here the PDR should also regularly retry to obtain the locator(s) for those episodes.

The process of translating a CRID into other CRIDs or locators is known in TV-Anytime as location resolution.

Location resolution involves mapping a location-independent content reference (the CRID) to its location in time (e.g. scheduled transmission time in a broadcast system) and space (e.g. TV channel, IP address). As explained above, these locations in time and space are referred to as "locators." The process of location resolution may happen inside the PDR or by using a physically remote server, such as a server on the Internet.

To the PDR, the CRID essentially contains opaque information, which it cannot resolve to a location without external assistance. A Resolution Provider (RP) which provides locator information for CRIDs is provided to solve this problem. Usually multiple RPs are available, and the PDR must know which RP to use for a particular CRID. Often, this is the same body that created the CRID. The name of the authority is present in the CM) in the <authority> field, as explained above. This name is present in the form of a registered Internet domain name. It is possible for a resolution provider (RP) to be found on the Internet using the domain name resolution process specified in the TV-Anytime specification SP004.

Each resolution will require one or more Resolving Authority Records (RAR) to exist in the PDR for location resolution to take place. Each resolving authority record will need to be placed inside some sort of transport specific container which allows the PDR to know that this is a RAR. In the case of multiple records for the same authority, the PDR can choose to just use one of them, or try them all in turn. The Resolving Authority Record (RAR) contains the information that identifies the resolution providers where content reference resolution information can be found.

Using the RAR, the PDR determines which RP to use to resolve a particular CRID. The PDR then submits a request for a location accompanied by a CRID to the Resolution Provider in question. In response to this request, the Resolution Provider returns the locator information (assuming this information is available in that RP, of course). The PDR can then access the content source and obtain the content item. A content item may have more than one locator, for example if it is broadcast multiple times or available from multiple providers. The PDR may then choose which locator to use, or prompt the user to make a selection.

Once the locator information has been obtained, the PDR waits for the specified date and time and then records the episode as it is broadcast on the specified channel. Of course, if the locator indicates a location on the Internet or the like, the PDR can simply retrieve the content from the indicated location as soon as it becomes available.

Content items for which locator information is available can be recorded by the PDR at the appropriate moment. To this end, the PDR may comprise local storage such as a sufficiently large hard disk, and/or a device such as a DVD+RW writer. The storage medium on which content items are stored needs not be local to the PDR, but may also be an external device such as a hard disk or a file server connected to the PDR via a home network. Once the content items have been recorded, they can be played back at any time until they have been erased.

If the PDR operates in accordance with a Digital Rights Management system, then a content item may be erased when the rights associated with the content item require such erasure. Also, some content items may not come with a right to record the item at all, or with a right that permits viewing only for a limited amount of time, or for a limited number of times. The PDR should then erase the content item when the limit is exceeded, or refuse further access to the content until further rights are obtained that permit further access.

FIG. 2 schematically illustrates a first embodiment of the PDR. In this embodiment, the PDR comprises a signature verification module SIG VERIFIER, a CRID resolution module RESOLVER and a content retrieval module RETRIEVER. Also present is a local storage medium HD and an optional module DRM for managing digital rights associated with content retrieved by the RETRIEVER module and stored on the HD.

The RESOLVER module is responsible for the location resolution process as described above. Given a CRID and a RAR, the RESOLVER is arranged to obtain a locator for the content identified by the CRID. This locator is then supplied to the RETRIEVER module which downloads or otherwise obtains a specimen of the content. This content can be stored on the local storage medium HD.

In a first embodiment of the invention, digital signatures are used to sign the content of the CRID. Only properly signed CRIDs will be accepted by the SIG VERIFIER module in the PDR. Such CRIDs can be trusted to originate from a trustworthy authority. It does not protect against incorrect resolution of the CRID. If the SIG VERIFIER module correctly verified the signature, the PDR can assume that the CRID is authentic. If the signature is not verified as correct, the RESOLVER should refuse to obtain a locator for the content using the CRID. This could for example be implemented by having the SIG VERIFIER module receive the CRIDs and pass them on to the RESOLVER only if the signature is correctly verified. Thus, content and service providers can be sure that PDRs will only obtain content using authentic CRIDs. A further advantage of this aspect is that this allows a PDR to detect a malformed or corrupted CRID, since such a CRID would also have an invalid digital signature.

Signing individual CRIDs preferably is done without changing the CRID format. Furthermore, the amount of information is small, making the protection weaker. One way to add signatures to individual CRIDs is by adding them to the end of the CRID. In this way, the signature would be part of the data part of the CRID and will not harm normal behavior.

As the amount of information that can be added to a CRID is limited, only the core can be specified. Furthermore, due to the size of the CRID, no hashing is needed and the signature can be directly calculated using a PKI algorithm.

In accordance with the present invention, the CRID is redefined as follows. The syntax of a signed CRID is: CRID://<authority>/<data>&<signatureAuthority>:<signature>

The meaning of the elements in the above is as follows.

<authority> Uses the TV-Anytime authority naming rules given in section 7 of TV-Anytime specification document SP002 to assure uniqueness.

<data> is a free format string that is Uniform Resource Identifier (URI) compliant, and is meaningful to the authority given by the <authority> field. The <data> portion of the CRID is case insensitive.

<signatureAuthority> Uses the TV-Anytime authority naming rules given in section 7 of SP002 to assure uniqueness. The signatureAuthority indicates the party that defined the algorithm and manner of calculating the signature.

<signature> The signature value of this CRID calculated as defined by the signatureAuthority.

More than one signature can be applied by resigning the signed CRID. Some or all of the previous signatures can be included in the competition of a new signature. This could be indicated using another additional field, for example separated by one of the other (reserved) characters. Some examples of signed CRIDs are:

CRID://comp.com/3874y32&comp.com:32843829174
CRID://broadcast.com/1.4.5&sign.com:7asd76ad7

As a variation of this method, it is possible to use a different URL type to represent a signed CRID. An example of this variation is:

SCRID://comp.com/3874y32&comp.com:32843829174

Different orders and different characters could be used to comprise the new signed CRID. Also, a restriction could be added that indicated markers may not be used in the data part ("&" and ":").

In another embodiment of the invention, the resolution provider signs the locator that is passed to the PDR. This way the location of the content to be retrieved can be trusted, i.e. the PDR can verify that the locator has not been changed and that the locator originates from a certain resolution provider. If the signature can be checked against some certificate signed by the CRID authority, the PDR can also make sure the CRID authority trusts the resolution provider. The locator could also be encrypted to enable a pay service similar to the one for encrypted CRIDs, as discussed below.

In another embodiment of the invention, the RAR is signed either by the resolution provider or by the CRID provider. This protects the PDR, and hence the customer, from malicious RARs. If the RAR is signed by the CRID authority, or the signature from the resolution provider can be authenticated by the CRID authority, then the PDR would be stopped from finding resolution providers that were not trusted by the CRID authority. The RAR could also be encrypted to enable a pay service similar to the one for encrypted CRIDs, as discussed below.

As an optional extension, the provider of the CRID or RAR can make a public key for a particular resolution provider available, preferably by providing the public key with the CRID or the RAR. Using this public key the PVR can verify the signed response by a resolution provider. This way the PDR can determine that this response (and the resolution provider) is acceptable to the provider of the CRID or RAR. Preferably the public key is provided in the form of a digital certificate signed by the provider of the CRID or RAR.

FIG. 3 schematically illustrates a second embodiment of the PDR. In this embodiment, the SIG VERIFIER module has been replaced by a DECRYPTOR module. This module is arranged to decrypt an at least partially encrypted CRID, RAR or locator and to pass the decrypted CRID, RAR or locator on to the RETRIEVER.

In one variant of embodiment, the <data> part of the CRID is at least partially encrypted, with a key only known to the resolution provider. If there are multiple resolution providers, multiple encryption keys should be used. Preferably, the encryption is performed using asymmetric cryptography, although symmetric encryption is also possible. This way only authorized resolution providers would be able to interpret the <data> and perform content resolution. Note however that the <data> portion of a CRID is essentially a meaningless string to the PDR. Encrypting a meaningless string just makes another meaningless string. For broadcast location resolution the PDR is simply pattern matching the CRID against a resolution table that is being broadcast. For IP resolution an encrypted <data> part could be used, but it would not stop a malicious resolver from mapping the encrypted CRID to the wrong content.

To overcome this problem, it is advised to encrypt the <data> part of a CRID differently for different instances in time and for different users. For example, the cleartext <data> part could be extended with random padding which the receiver can simply filter out. This makes it harder to guess the "in the clear" data based on the value of the ciphered data.

It is also possible to encrypt the entire CRID. In this case the location resolution can subsequently be offered to users as a pay service. In this case, only users which have subscribed to the location resolution service will be able to map the CRID onto the RAR and send it (possibly in the clear) to a resolution authority. Similarly the RAR could be encrypted, or even the locator from the resolution authority. If paying for the service, users will preferably use the authorized/intended resolution provider.

FIG. 4 schematically illustrates a third embodiment of the PDR. In this embodiment, the SIG VERIFIER module has been replaced by a RIGHTS EXTRACTOR module.

The content retrieved by a user may be protected. Typically content protection is used to guard against unauthorized copying or other unauthorized use of the content. If protected content is obtained a cryptographic key and/or rights are required to use (watch) the content, i.e. the user needs to access another entity, which is an authorization server.

In this embodiment, the process of location resolution and the steps necessary for providing the rights and keys for access, are combined by providing a right for access to the content together with the CRID, RAR or locator. This right is extracted by the RIGHTS EXTRACTOR module and supplied to the DRM module. This has the following advantages:

It is not required any more for the user to separately also contact a rights server.

If content is protected, users are in any case required to contact an authorized resolution authority, as they only in this way obtain the correct rights to use the content.

The access control system might be sophisticated, i.e. a Digital Rights Management (DRM) system, but could also be very simple, e.g. comparable to a system as described in International Patent Application WO 01/86387.

This embodiment is especially advantageous when the resolution provider is the same entity that is providing the content. An example of where this would not work is when for instance a TV broadcaster creates the CRID, a 3rd party TV program listings service resolves the CRID and a satellite TV provider provides the content via their satellite service.

In a further embodiment the location resolution process and a DRM system are further integrated. The CRID in this embodiment is also used to obtain information for obtaining rights by using the location resolution process. Next to locating the content the resolution provider will also be capable of resolving the location on where to obtain the rights. A RP may even offer such functionality as a service to the user as it may be able to locate the cheapest rights for that specific piece of content and pass the location of these rights to the user. The user can then contact this location and buy the rights.

In another embodiment benefits are enclosed in the <data> part of a CRID or sent along with or in RARs and locators. With such means users can be stimulated to contact a specific resolution provider as the user may receive benefits, such as a discount for buying a movie. The benefit could also comprise credits of some kind, for example a number of Air Miles or other points for use in a bonus system. The credits could also be exchanged for access to additional content material related to the content referenced by the CRID. One possible realization of this last option is described in international patent application PCT/IB02/03023 by the same applicant as the present application.

Other type of business models can also be realized using this solution. Offering a specific CRID with benefit data in it to a resolution provider may automatically result in a right to use the content item as indicated by the locator or to obtain the locator. This mechanism may be used to stimulate watching a program to be able to watch a next program.

The measures used in the above embodiments can be used individually, but these measures could also be combined to provide for better protection, or for protection against multiple threats.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer.

In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for resolving a content reference identifier (CRID), comprising:
   identifying a content item;
   obtaining a locator from the identified content item, the locator identifying a location where a specimen of the content item can be obtained;
   obtaining, using a content retriever module, the specimen of the content item using the identified location;
   providing, using a rights extractor, an access key and a digital right for access to the content to an end user dependent on information provided with the CRID or the locator for obtaining access to the content; and
   managing in hardware, using a digital rights management module, access to the content item using the access key and the digital right.

2. A device arranged for resolving a content reference identifier (CRID), comprising:
   a locator module configured to provide a locator identifying a location where a specimen of a content item can be obtained;
   a retriever module configured to obtain the specimen of the content item using the identified location;
   a digital rights extractor module configured to provide an access key and a digital right for access to the content to an end user dependent on information provided with the CRID or the locator for obtaining access to the content; and
   a digital rights management module configured to manage access to the content item using the access key and the digital right.

3. The device as claimed in claim 2, comprising means to verify a digital signature provided for at least a portion of at least one of the CRID and the locator.

4. The device as claimed in claim 2, comprising means for decrypting at least one of the CRID and the locator provided at least partially in encrypted form.

5. The device as claimed in claim 2, wherein the specimen of the content item can be obtained conditionally upon verifying a measure applied to at least one of the CRID and the locator to verify integrity.

6. The device as claimed in claim 5, wherein verifying a measure to verify integrity includes verifying a measure to verify origin authentication.

7. The device as claimed in claim 3, wherein the digital signature is provided for at least a portion of the locator and can be verified using a public key provided by a CRID provider.

8. The device as claimed in claim 7, wherein the public key is provided with the CRID.

* * * * *